United States Patent [19]
Girard

[11] 3,879,790
[45] Apr. 29, 1975

[54] PIPE LINE PIG

[76] Inventor: Harry J. Girard, 2422 Bartlett St., Houston, Tex. 77006

[22] Filed: Dec. 17, 1970

[21] Appl. No.: 98,985

Related U.S. Application Data

[62] Division of Ser. No. 835,424, June 23, 1969, abandoned.

[52] U.S. Cl.......................................... 15/104.06 R
[51] Int. Cl............................................. B08b 9/04
[58] Field of Search......... 15/104.06, 104.06 A, 3.5; 137/268; 264/45

[56] References Cited
UNITED STATES PATENTS

| | | | |
|---|---|---|---|
| 1,756,378 | 4/1930 | Oberhuber | 15/104.06 R |
| 3,204,274 | 9/1965 | Knapp | 15/104.06 R |
| 3,389,417 | 6/1968 | Knapp et al | 15/104.06 R |
| 3,403,701 | 10/1968 | Knapp et al | 15/104.06 R |

*Primary Examiner*—Edward L. Roberts

[57] ABSTRACT

A pipe line pig formed of resilient material having a durable outer covering to protect the same against wear and abrasion and adapted to be propelled through a pipe line by a pressure gradient therein. The pig is compressible and the covering is formed with openings through which the resilient material extends to form a continuous cylindrical external surface for contact with the surrounding wall of the pipe.

The invention includes a method of forming the pig which includes the molding of the covering in a mold provided with a flangible core; removing the core and filling the mold and covering therein with the resilient material.

20 Claims, 8 Drawing Figures

PATENTED APR 29 1975　　　　3,879,790
SHEET 1 OF 2
FIG. 1
PRIOR ART
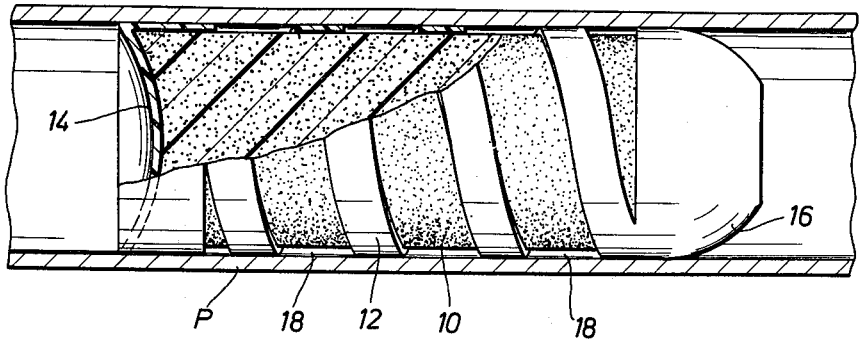
FIG. 2
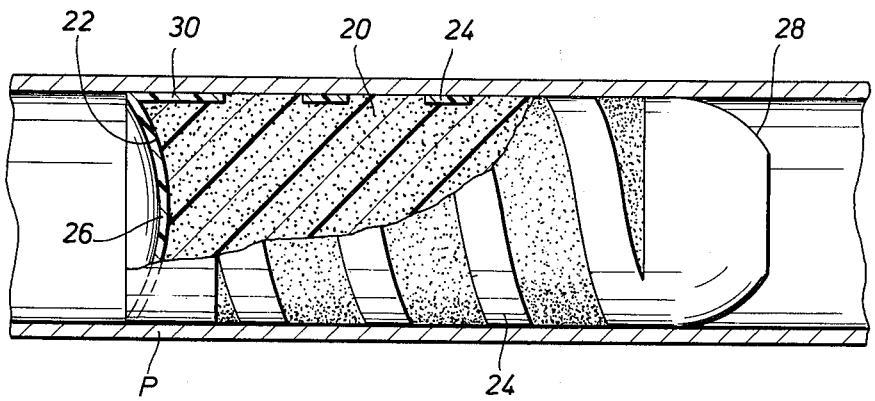
FIG. 3
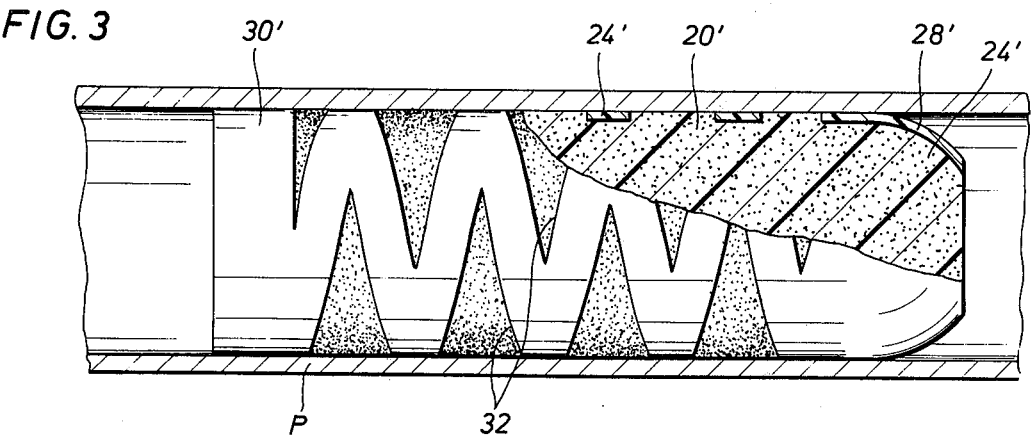
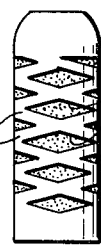
FIG. 7
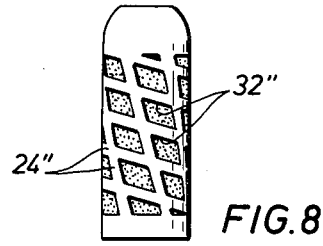
FIG. 8
Harry J. Girard
INVENTOR
BY
ATTORNEY Harry J. Girard
INVENTOR

BY

ATTORNEY

PIPE LINE PIG

This application is a division of Applicant's prior copending application Ser. No. 835,424, filed June 23, 1969, for PIPELINE PIG AND METHOD OF MAKING SAME, now abandoned.

BACKGROUND OF THE INVENTION

In the operation and maintenance of pipe lines, it is customary to insert pigs in the line which are propelled therethrough by a pressure gradient in the line to clean the line. Such pigs are commonly formed of resilient material, such as foamed plastic of generally cylindrical shape, somewhat larger than the interior of the pipe so that the pigs are compressed upon insertion in the line, and due to the relatively soft character of the resilient material, the pigs are subject to rapid wear, abrasion and even disintegration from contact with internal roughness in the pipe, internal protrussions therein, or from being forced through restrictions or misshapen portions of the pipe.

Various expedients have been proposed for strengthening and reenforcing such pigs, by the provision of durable coatings on the resilient material thereof, the winding of spiral strip-like elements about the exterior thereof, and the provision of mesh-like sleeves or criss-cross strips of more durable material around the outside of the resilient material.

Protective or reenforcing means of this kind when applied in the usual manner protrude radially somewhat from the resilient body of the pig and are frequently badly worn, torn, or separated from the resilient body of the pig by engagement with roughened or corroded surfaces or internal protrussions in the pipe to an extent to render the pigs useless for further pipe cleaning operations.

SUMMARY OF THE INVENTION

Briefly stated, the pipe line pig of the present invention comprises an inner resilient body formed of foamed plastic material, or the like, such as foamed polyurethane, of generally cylindrical shape and an outer protective covering on the body formed of more durable and wear resistant material, such as unfoamed polyurethane plastic, or other solid material having openings therethrough into which the resilient material of the body extends to form with the covering a continuous outer cylindrical surface extending substantially from end to end of the pig for engagement with the surrounding wall of a pipe.

The invention also includes a method of making pipe line pigs of the type referred to which comprises molding the outer covering in a mold having a core formed of frangible or easily fragmented material; removing the core from the interior of the mold and covering, while leaving the covering in the mold; and filling the mold and covering with the resilient material to form the pig with the covering attached thereto and the resilient material extending into the openings of the covering to form therewith a continuous, uninterrupted outer cylindrical face extending substantially from end to end of the pig.

Another object of the invention is to provide a pipe line pig of improved structure and durability, of the general type disclosed in the following prior U.S. Pat. Nos.: 3,204,274, Sept. 7, 1965, Mary M. Knapp; 3,389,417, June 25, 1968 Mary M. Knapp and Harry J. Girard; and in prior application of the applicant herein, Ser. No. 676,990, filed Sept. 29, 1967, and now U.S. Pat. No. 3,474,479.

BRIEF DESCRIPTION OF THE VIEWS OF THE DRAWINGS

FIG. 1 is a side elevational view, partly broken away and partly in cross section, of a pipe line pig of a conventional construction, showing the same in position in a pipe line;

FIG. 2 is a view similar to that of FIG. 1, illustrating a preferred embodiment of the pipe line pig of the invention;

FIG. 3 is a view similar to that of FIG. 2 illustrating a somewhat different form of the pig of the invention;

FIG. 7 is a side elevational view, on a reduced scale, of a modified form of the pig of the invention; and FIG. 8 is a view similar to that of FIG. 7, showing a further modification of the pig of the invention.

Figure 4:
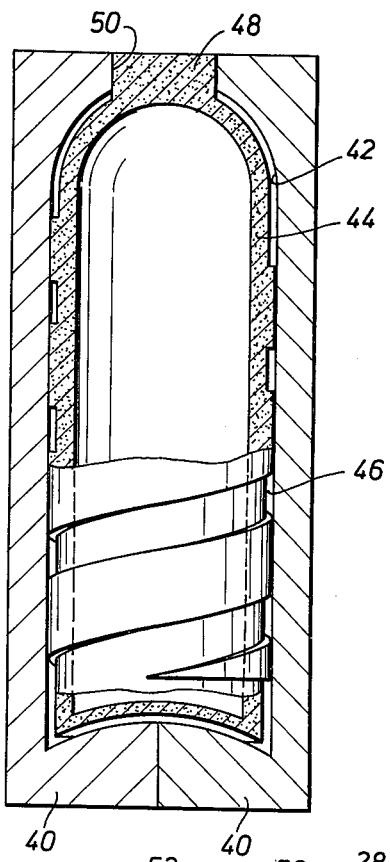
FIG. 4 is a side elevational view, partly broken away and partly in cross section, illustrating a preferred form of mold for use in the making of a pig by the method of the invention.

DETAILED DESCRIPTION OF A PARTICULAR EMBODIMENT OF THE INVENTION AND OF THE CARRYING OUT OF THE METHOD

The invention is disclosed herein in connection with a pipe line pig of a general type, such as that illustrated in FIG. 1, comprising a generally cylindrical, elongated body 10 formed of resilient material, such as foamed plastic, adapted to be inserted into a pipe line P for propulsion there along by the pressure in the fluid flowing in the line.

The resilient body 10 of the pig is commonly made of relatively durable material, such as foamed polyurethane plastic, but due to internal roughness of the pipe or other causes, such a body is subject to severe wear in use and is often badly damaged by tearing, grooving or fragmentation to the extent that it is soon rendered ineffective for the purpose.

To prevent such wear and tear of the resilient body, a tough outer flexible coating or cover material 12, formed of unfoamed plastic such as unfoamed polyurethane, teflon, or the like, is sometimes applied to the foamed body, which coating is often in the form of a spiral strip, mesh, or the like. The outer coating may also have a portion 14 covering the rear end of the body and positioned to provide a fluid tight seal with the surrounding wall of the pipe and a front or nose portion 16.

The outer covering 12 thus provided projects somewhat beyond the outer surface of the body 10, leaving openings or gaps 18 between the body and the wall of the pipe into which the body is expanded radially upon longitudinal compression of the body in the pipe. Moreover, due to the projection of the strip-like coating 12, the same are likely to catch on any roughness or internal projections in the pipe, resulting in tearing of the coating.

The pipe line pig of the present invention, as illustrated in FIGS. 2 and 3, comprises a resilient body or core 20, formed of suitable elastic material such as foamed polyurethane or other plastic, which may be of generally cylindrical, elongated shape, having a somewhat concave rear end 22 and a curved or bullet-shaped front end or nose, and provided with an external coating or cover 24 which may conveniently be of strip-like character extending spirally about the body and formed at the rear end thereof with a portion 26 covering the concave rear end of the body and at the forward end partly covering the rounded nose, as seen at 28. At the rear end of the body, the strip-like covering has an annular portion 30 which is integral with the end portion 26 and which is positioned for sealing contact with the surrounding wall of the pipe.

The resilient, foamed body 20 extends radially outwardly between the turns of the outer covering 24 at least as far as the outer surface of the covering, so that the pig has a continuous outer, cylindrical surface extending substantially throughout the length of the body positioned for engagement with the surrounding wall of the pipe.

A somewhat different form of the pig of the invention is shown in FIG. 3 wherein the outer durable, unfoamed strip-like cover 24' is shaped to form an open, mesh-like or criss-cross pattern having openings 32, through which the resilient body or core 20' is extended radially at least as far as the outer surface of the cover 24' to form a continuous outer cylindrical surface extending substantially throughout the length of the pig, positioned for engagement with the surrounding wall of the pipe.

In other respects, the invention as illustrated in FIG. 3 is similar to that illustrated in FIG. 2.

A further modification of the pig of the invention is illustrated in FIG. 7, wherein the outer cover 24" of the body is formed with strip-like portions extending spirally in opposite directions about the resilient core, and which intersect to form openings 32' of generally diamond shape in which the resilient material of the core is extended to provide a substantially continuous, cylindrical, external surface on the pig.

In FIG. 8, there is illustrated a still further form of the invention in which the outer cover 24''' is of strip-like character having portions extending spirally in the same direction about the core, these portions being of substantially different pitch and providing openings 32" into which the material of the core extends to form a substantially continuous, cylindrical, external surface of the body.

The pigs of the invention may be made in various sizes and are preferably of somewhat larger diameter than the internal diameter of the pipeline with which they are to be used.

In making use of the pig of the invention, the pig is inserted into the pipe P, in which it preferably has a tight fit, as seen in FIGS. 2 and 3, The pig will then be propelled through the line by a pressure gradient therein. The pressure exerted on the pig to propel the same along the pipe will tend to expand the pig radially, thus increasing the pressure of the pig against the surrounding wall of the pipe as the pressure of fluid in the pipe increases.

It will be apparent that due to the flexibility of the pig it may pass readily about bends in the pipe or through portions of the line which are of irregular shape or in which internal protrussions or roughness may occur, without undue wear and tear, and without breaking the sealing contact of the pig with the pipe.

The outer cover of the body may, of course, be formed of any suitable material, such as hard plastics or steel, to provide edge portions capable of scraping the internal surface of the pipe while affording protection against wear to the softer, resilient inner body. The outer cover may also be provided with an abrasive coating or the like to cut away corrosion or deposited material on the pipe.

Figure 5:
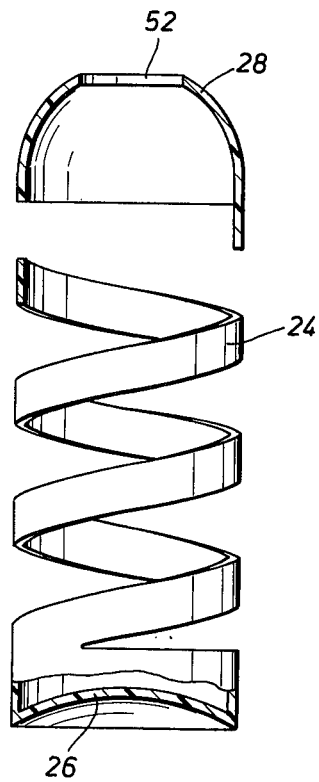
FIG. 5 is a side elevational view, partly broken away and partly in cross section, of the exterior part of a pig made with the mold of FIG. 4, and illustrating one stage of the method of the invention.
Figure 6:
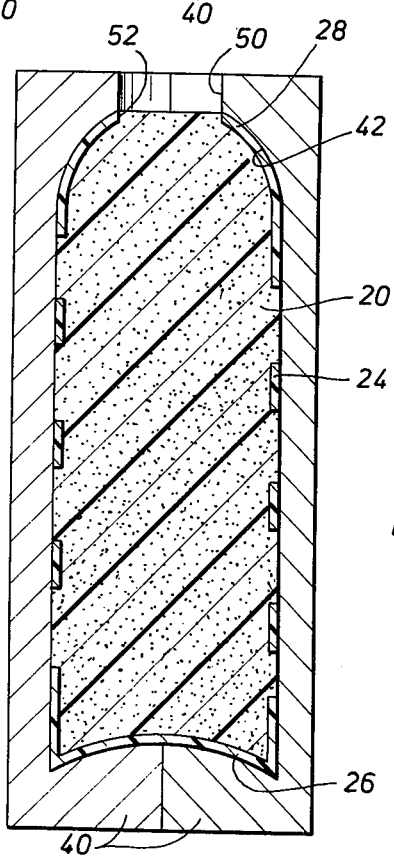
FIG. 6 is a longitudinal, central, cross sectional view of molding apparatus with the pig of the invention cast therein and illustrating a further stage of the method of the invention.

A preferred method of making the pigs in accordance with the invention and the apparatus by which the same may be carried out is illustrated in FIGS. 4, 5 and 6.

The method includes the molding of the outer cover part of the pig, by any suitable process, such as by a lost core casting method, die casting, centrifugal casting, injection molding or blow molding, and the subsequent filling of the shell thus formed with foamed plastic or other resilient core material.

For the purpose of forming the outer cover, an outer mold casing may be provided, such as that shown in FIGS. 4 and 6, which may be formed of any suitable material, preferably made in two complementary parts 40, 40, to form a cavity 42 having an internal shape conforming to the external shape of the inner body or core portion 20 of the pig.

An inner core, 44, which may be of an expendable type, such as used in the lost core casting process, is provided, for insertion in the cavity 42 and which is shaped to form with the mold parts 40, 40 a cavity 46, having the shape of the shell-like outer cover 24 of the pig. The inner core 44 also has a central, end neck portion 48 which fills an end opening 50 of the outer mold casing.

The inner core may be of hollow construction formed of any suitable material, such as wax, or a friable composition of a well known type, which may be molded in the desired shape and dried for insertion in the outer mold casing, and which may then be easily removed from the finished outer covering after casting of the same.

The inner core 44 thus has the external shape of the inner resilient body 20, and the cavity 46 has the shape of the outer cover which is to be provided for the body.

The unfoamed plastic, or other material, of the outer covering is introduced into the cavity 46 in the usual way as by providing a suitable opening, not shown, through which the material may enter in a well known manner.

When the outer cover shell has been thus molded, it is removed with the core 44 from the mold and the core disintegrated to leave the shell-like cover in the condition shown in FIG. 5. It will be seen that the shell-like cover unit thus provided has an end opening 52 in the rounded nose portion 28 thereof.

The cover portion thus formed is then reinserted in the outer mold casing, as shown in FIG. 6, and the material forming the resilient, foamed plastic body is introduced into the mold through the neck opening 50 and the end opening 52 to fill the mold. Upon setting or curing of the body material, the pig is removed from the mold in condition to be inserted in the pipe line.

The method of the invention thus comprises molding a fragible core having the external shape and size of outer covering to be provided for the inner resilient body of the pig; enclosing the core in a mold shaped to form therewith a cavity having the shape of the outer covering to be provided and filling the cavity with the material to form the outer covering having openings therethrough; removing the core from the interior of the molded covering and from the mold; and filling the mold and covering with the resilient body material to form the inner body filling the covering and the openings therein.

It will be evident that the frangible material of the core 44 may be readily be knocked out of the mold after the cavity 46 has been filled, leaving the outer covering 24 in the mold ready for filling with the resilient body material. By this procedure, the covering may be formed with and attached securely to the body, so that the pig is ready for use when removed from the mold.

In making use of the invention, the finished pig is inserted into the pipe line P in a well known manner, the pig being of a size to closely fit the interior of the pipe and the pig is propelled along the pipe by pumping fluid into the line behind the pig. Due to the resilient character of the inner body 20 of the pig, the body will be compressed longitudinally under the pressure of fluid in the line to cause the foamed plastic material to be compressed radially in the openings 32 of the covering against the surrounding wall of the pipe and to press the covering more tightly against the wall. In the event that the covering is of strip-like character, extending spirally about the body, as shown in FIGS. 1 and 2, the pig may be caused to rotate in the pipe during its movement therealong. It will also be seen that the outer covering may be of criss-cross formation, as seen in FIG. 3, without overlapping or crossing of the strip-like material, so that a continuous cylindrical outer surface is provided extending substantially from end to end of the pig for engagement with the surrounding wall of the pipe.

It will thus be seen that the invention provides a pipe line pig which is compressible under the influence of pressure in the pipe line but which is protected against wear and abrasion due to roughness on the interior of the pipe.

What is claimed as new and desired to secure by Letters Patent is:

1. A pipeline pig adapted to be inserted in a pipe to be propelled therethrough by a pressure gradient, comprising:

a generally cylindrically shaped body formed of resilient material;

a covering for said body formed of material which is of harder and more durable material than said body and having radially disposed openings therein into which the material of said body extends in the uncompressed state before said pig is inserted in said pipeline to form with said covering a continuous cylindrical surface extending substantially from end to end thereof positioned for engagement with the surrounding wall of the pipe.

2. The pipe line pig as claimed in claim 1 wherein said body is formed of foamed plastic material.

3. The pipe line pig as claimed in claim 1 wherein the openings in said covering are shaped to provide a strip-like portion of the covering positioned spirally about the body.

4. The pipe line pig as claimed in claim 1 wherein the openings in said covering are shaped to provide strip-like portions of the covering disposed in a criss-cross pattern about the body.

5. The pipe line pig as claimed in claim 1 wherein the openings in the covering are shaped to provide strip-like portions of the covering, one of which extends spirally in one direction about the body and another of which extends spirally in the other direction about the body.

6. The pipe line pig as claimed in claim 1 wherein said covering includes a portion covering one end of the body and positioned for sealing engagement with the surrounding wall of the pipe to prevent the flow of fluid in the pipe past said body.

7. The pipe line pig as claimed in claim 2 wherein said body is formed with a concave rear end face and said covering includes a portion covering said face and extending annularly about the body adjacent said face in position for sealing engagement with the surrounding wall of the pipe.

8. A pipeline pig adapted to be passed through a pipeline for clearing same of an accumulation of debris and other matter, which comprises an elongate cylindrical body having a cross section contacting the inner wall of the pipeline, said cylindrical body having a leading edge which includes the point of contact of the pig against the pipeline, and a ring member in said body at the point of contact against the pipeline, said ring member being of increased hardness when compared to that of the body of the pig for sustaining the bulk of the wear of the pig as it traverses the pipeline and spiral members extending about the cylindrical body of said pig and being of a harder material than that of said body, said spiral members adapted to bear against the pipeline to impart a twist or rotation to the pig as it traverses the pipeline.

9. The invention of claim 8 including a second ring member mounted flush with the cylindrical body portion of said pig and being located at the rearward line of contact of the cylindrical body against the pipeline.

10. A pipeline pig adapted to be passed through a pipeline for clearing same of an accumulation of debris and other matter, which comprises an elongate cylindrical body having a cross section contacting the inner wall of the pipeline, said cylindrical body having a leading edge which includes the point of contact of the pig against the pipeline, and a ring member in said body at the point of contact against the pipeline, said ring member being of increased hardness when compared to that of the body of the pig for sustaining the bulk of the wear of the pig as it traverses the pipeline, and a second spaced ring member along the cylindrical body of said pig, there being a spiral member between said ring members for imparting a twist to said pig as it traverses the pipeline.

11. A pipeline pig adapted to be passed through a pipeline for cleaning same of an accumulation of debris and other matter, which comprises:

an elongate cylindrical body having a diameter sufficient to resiliently contact the inner wall of the pipeline, said body having a leading edge which includes the point of contact of the pig against the pipeline;

an annular member mounted flush with the external surface of said body at the point of contact against the pipeline, said annular member being of increased hardness as compared to that of the body of the pig for sustaining the bulk of the wear of the pig during movement thereof through the pipeline;

and a spiral member extending about and being flush with the body of said pig and being of a harder material than that of said body, said spiral member being adapted to bear against the pipeline to impart rotation to the pig during movement thereof through the pipeline.

12. An improved pipe-cleaning resilient plug which comprises:

an elastomeric tubular casing with a nosepiece across one end thereof and a solid wall across the second end thereof;

an elastomeric foam filler positioned within said casing and at least one opening located in a wall of said casing other than in the solid wall across the second end thereof;

and wherein the said elastomeric foam filler extends into the openings at least to the exterior surface of the wall of the casing in its uncompressed state whereby a pipe of the same interior diameter as the exterior diameter of the plug is contacted by the said filler.

13. A structure as specified in claim 12 in which:
the elastomeric material is polyurethane.

14. A structure as specified in claim 12 in which:
the nosepiece is rounded in a parabolic curve.

15. A structure as specified in claim 12 in which:
an opening is positioned in the front end of said nosepiece.

16. A structure as specified in claim 12 in which:
the casing is a molded unitary piece.

17. A structure as specified in claim 12 in which:
there are a plurality of openings;
and in which the foam filler is porous.

18. An improved pipe-cleaning resilient plug which comprises:

an elastomeric tubular casing with a nosepiece across one end thereof and a solid wall across the second end thereof;

an elastomeric foam filler positioned within said casing;

and at least one opening located in a wall of said casing other than in the solid wall across the second end thereof;

and wherein the central area of the said foam filler and solid wall is recessed to provide an annular flange positioned around the periphery of the said second end of said casing.

19. An improved pipe-cleaning resilient plug which comprises;

an elastomeric tubular casing with an essentially cylindrical outer wall, a nosepiece across one end thereof and a solid wall across the second end thereof;

an elastomeric foam filler positioned within said casing;

and at least one opening located in the wall of said casing;

and at least one opening in said nosepiece to add to the flexibility and maneuverability of the plug.

20. An improved pipe-cleaning resilient plug which comprises;

an elastomeric tubular casing with a rounded nosepiece across one end thereof said nosepiece having at least one opening therein and a solid wall across the second end thereof;

an elastomeric foam filler positioned within said casing;

and at least one opening located in a wall of said casing other than in the solid wall across the second end thereof.

* * * * *